US008595743B2

(12) United States Patent
Gounares et al.

(10) Patent No.: US 8,595,743 B2
(45) Date of Patent: Nov. 26, 2013

(54) NETWORK AWARE PROCESS SCHEDULING

(75) Inventors: Alexander G. Gounares, Kirkland, WA (US); Charles D. Garrett, Woodinville, WA (US)

(73) Assignee: Concurix Corporation, Kirkland, WA (US)

( * ) Notice: Subject to any disclaimer, the term of this patent is extended or adjusted under 35 U.S.C. 154(b) by 44 days.

(21) Appl. No.: 13/461,752

(22) Filed: May 1, 2012

(65) Prior Publication Data
US 2013/0117759 A1    May 9, 2013

(51) Int. Cl.
G06F 9/46       (2006.01)

(52) U.S. Cl.
USPC ........................................................ 718/104

(58) Field of Classification Search
None
See application file for complete search history.

(56) References Cited

U.S. PATENT DOCUMENTS

| | | | |
|---|---|---|---|
| 3,643,227 A | 2/1972 | Smith et al. |
| 4,631,674 A | 12/1986 | Blandy |
| 5,506,987 A | 4/1996 | Abramson et al. |
| 5,900,001 A | 5/1999 | Wolczko et al. |
| 5,903,900 A | 5/1999 | Knippel et al. |
| 6,006,235 A | 12/1999 | Macdonald et al. |
| 6,038,572 A | 3/2000 | Schwartz et al. |
| 6,047,295 A | 4/2000 | Endicott et al. |
| 6,098,080 A | 8/2000 | Endicott et al. |
| 6,104,962 A | 8/2000 | Sastry |
| 6,128,642 A | 10/2000 | Doraswamy et al. |
| 6,230,183 B1 | 5/2001 | Yocom et al. |
| 6,289,360 B1 | 9/2001 | Kolodner et al. |
| 6,308,319 B1 | 10/2001 | Bush et al. |
| 6,317,756 B1 | 11/2001 | Kolodner et al. |
| 6,421,704 B1 | 7/2002 | Waldo et al. |
| 6,484,188 B1 | 11/2002 | Kwong et al. |
| 6,490,599 B2 | 12/2002 | Kolodner et al. |
| 6,490,612 B1 | 12/2002 | Jones |
| 6,519,615 B1 | 2/2003 | Wollrath et al. |
| 6,542,978 B2 | 4/2003 | Goldstein et al. |
| 6,560,773 B1 | 5/2003 | Alexander, III et al. |
| 6,564,240 B2 | 5/2003 | Waldo et al. |
| 6,658,449 B1 | 12/2003 | Brenner et al. |
| 6,735,769 B1 | 5/2004 | Brenner et al. |

(Continued)

FOREIGN PATENT DOCUMENTS

| | | |
|---|---|---|
| EP | 1912119 A | 4/2008 |
| FR | 10-1998-0079594 A | 11/1998 |

OTHER PUBLICATIONS

International Searching Authority, International Search Report and Written Opinion, Feb. 27, 2013, PCT/US2012/056701, Korean Intellectual Property Office, Republic of Korea (9 pgs.).

(Continued)

Primary Examiner — Meng An
Assistant Examiner — James J Lee
(74) Attorney, Agent, or Firm — Russell S. Krajec

(57) ABSTRACT

A schedule graph may be used to identify executable elements that consume data from a network interface or other input/output interface. The schedule graph may be traversed to identify a sequence or pipeline of executable elements that may be triggered from data received on the interface, then a process scheduler may cause those executable elements to be executed on available processors. A queue manager and a load manager may optimize the resources allocated to the executable elements to maximize the throughput for the input/output interface. Such as system may optimize processing for input or output of network connections, storage devices, or other input/output devices.

17 Claims, 4 Drawing Sheets

(56) References Cited

U.S. PATENT DOCUMENTS

| | | |
|---|---|---|
| 6,738,875 B1 | 5/2004 | Wang |
| 6,748,593 B1 | 6/2004 | Brenner et al. |
| 6,760,736 B2 | 7/2004 | Waldo et al. |
| 6,763,520 B1 | 7/2004 | Seeds |
| 6,823,515 B2 | 11/2004 | Livecchi |
| 6,832,370 B1 | 12/2004 | Srinivasan |
| 6,868,488 B2 | 3/2005 | Garthwaite |
| 6,912,554 B2 | 6/2005 | Yuasa |
| 6,918,111 B1 | 7/2005 | Damron et al. |
| 6,925,644 B2 | 8/2005 | Waldo et al. |
| 6,954,775 B1 | 10/2005 | Shanklin et al. |
| 6,986,140 B2 | 1/2006 | Brenner et al. |
| 6,993,767 B2 | 1/2006 | Brenner et al. |
| 6,999,979 B2 | 2/2006 | Garthwaite |
| 7,016,923 B2 | 3/2006 | Garthwaite et al. |
| 7,031,990 B2 | 4/2006 | Garthwaite |
| 7,035,884 B2 | 4/2006 | Garthwaite |
| 7,058,670 B2 | 6/2006 | Garthwaite |
| 7,062,518 B2 | 6/2006 | Garthwaite |
| 7,062,519 B2 | 6/2006 | Garthwaite |
| 7,069,279 B1 | 6/2006 | Rau et al. |
| 7,069,280 B2 | 6/2006 | Garthwaite |
| 7,069,281 B2 | 6/2006 | Garthwaite |
| 7,092,978 B2 | 8/2006 | Garthwaite |
| 7,096,238 B2 | 8/2006 | Garthwaite |
| 7,136,887 B2 | 11/2006 | Garthwaite et al. |
| 7,143,124 B2 | 11/2006 | Garthwaite |
| 7,188,129 B2 | 3/2007 | Garthwaite |
| 7,209,935 B2 | 4/2007 | Garthwaite |
| 7,225,439 B2 | 5/2007 | Garthwaite |
| 7,228,541 B2 | 6/2007 | Gupton et al. |
| 7,251,815 B2 | 7/2007 | Donovan et al. |
| 7,308,466 B2 | 12/2007 | Houldsworth |
| 7,404,182 B1 | 7/2008 | Garthwaite et al. |
| 7,412,580 B1 | 8/2008 | Garthwaite |
| 7,487,237 B2 | 2/2009 | Lloyd et al. |
| 7,565,386 B2 | 7/2009 | Joisha |
| 7,565,499 B1 | 7/2009 | Garthwaite |
| 7,599,973 B2 | 10/2009 | Detlefs et al. |
| 7,613,753 B2 | 11/2009 | Cornet et al. |
| 7,640,544 B2 | 12/2009 | Flood et al. |
| 7,752,417 B2 | 7/2010 | Manczak et al. |
| 7,797,670 B2 | 9/2010 | Bumgarner et al. |
| 7,865,707 B2 | 1/2011 | Bittlingmayer et al. |
| 7,890,712 B2 | 2/2011 | Bitner et al. |
| 7,984,083 B2 | 7/2011 | Bacon et al. |
| 7,996,446 B2 | 8/2011 | Bacon et al. |
| 8,028,277 B2 | 9/2011 | Breitgand et al. |
| 8,055,725 B2 | 11/2011 | Alam et al. |
| 8,108,863 B2 | 1/2012 | Rakvic et al. |
| 2001/0018701 A1 | 8/2001 | Livecchi |
| 2003/0200356 A1 | 10/2003 | Hue |
| 2003/0212731 A1 | 11/2003 | Brenner et al. |
| 2004/0025163 A1* | 2/2004 | Babutzka et al. ............ 718/106 |
| 2004/0194104 A1 | 9/2004 | Beresnevichiene et al. |
| 2005/0071847 A1 | 3/2005 | Bentley et al. |
| 2005/0144364 A1 | 6/2005 | Tu et al. |
| 2005/0210472 A1 | 9/2005 | Accapadi et al. |
| 2006/0294167 A1 | 12/2006 | Borman et al. |
| 2007/0288911 A1 | 12/2007 | Martin |
| 2008/0005719 A1 | 1/2008 | Morris |
| 2008/0126453 A1 | 5/2008 | Cornet et al. |
| 2008/0139191 A1 | 6/2008 | Melnyk et al. |
| 2008/0271032 A1 | 10/2008 | Twaddle |
| 2009/0089552 A1* | 4/2009 | Inchingolo et al. ........... 712/216 |
| 2010/0318630 A1 | 12/2010 | Howell et al. |
| 2010/0333109 A1 | 12/2010 | Milnor |
| 2011/0067030 A1 | 3/2011 | Isard |
| 2011/0167245 A1* | 7/2011 | Lavrov et al. ................. 712/220 |
| 2012/0047514 A1 | 2/2012 | Seo et al. |
| 2012/0124339 A1* | 5/2012 | Krishnapura et al. ........ 712/216 |
| 2012/0204189 A1 | 8/2012 | Eichenberger et al. |
| 2012/0222019 A1 | 8/2012 | Gounares et al. |
| 2012/0222043 A1 | 8/2012 | Gounares et al. |
| 2012/0227040 A1 | 9/2012 | Gounares |
| 2012/0233592 A1 | 9/2012 | Gounares |
| 2012/0233601 A1 | 9/2012 | Gounares et al. |
| 2012/0284730 A1 | 11/2012 | Decusatis et al. |
| 2012/0297163 A1 | 11/2012 | Breternitz et al. |
| 2012/0317371 A1 | 12/2012 | Gounares |
| 2012/0317389 A1 | 12/2012 | Gounares |
| 2012/0317421 A1 | 12/2012 | Gounares |
| 2012/0317557 A1 | 12/2012 | Garrett |
| 2012/0317577 A1 | 12/2012 | Garrett |
| 2012/0317587 A1 | 12/2012 | Garrett |
| 2012/0324454 A1 | 12/2012 | Gounares et al. |
| 2013/0067445 A1 | 3/2013 | Gounares et al. |
| 2013/0073523 A1 | 3/2013 | Gounares et al. |
| 2013/0073604 A1 | 3/2013 | Gounares et al. |
| 2013/0073829 A1 | 3/2013 | Gounares et al. |
| 2013/0073837 A1 | 3/2013 | Li et al. |
| 2013/0074049 A1 | 3/2013 | Gounares et al. |
| 2013/0074055 A1 | 3/2013 | Gounares et al. |
| 2013/0074056 A1 | 3/2013 | Gounares et al. |
| 2013/0074057 A1 | 3/2013 | Gounares et al. |
| 2013/0074058 A1 | 3/2013 | Gounares et al. |
| 2013/0074092 A1 | 3/2013 | Gounares et al. |
| 2013/0074093 A1 | 3/2013 | Gounares et al. |
| 2013/0080760 A1 | 3/2013 | Li et al. |
| 2013/0080761 A1 | 3/2013 | Garrett et al. |
| 2013/0081005 A1 | 3/2013 | Gounares et al. |
| 2013/0085882 A1 | 4/2013 | Gounares et al. |
| 2013/0117753 A1 | 5/2013 | Gounares et al. |
| 2013/0117759 A1 | 5/2013 | Gounares et al. |
| 2013/0145369 A1* | 6/2013 | Biberstein et al. ............ 718/100 |
| 2013/0152088 A1* | 6/2013 | Gkantsidis et al. ........... 718/100 |

OTHER PUBLICATIONS

Daniel Lenoski, James Laudon, Kourosh Gharachorloo, Wolf-Dietrich Weber, Anoop Gupta, John Hennessy, Mark Horowitz, and Monica S. Lam, The Stanford Dash Multiprocessor, Mar. 1992, IEEE.

International Search Report, Jan. 29, 2013, Korean Intellectual Property Office, PCT/US2012/043811.

International Searching Authority, International Search Report and Written Opinion, Jan. 25, 2013, PCT/US2012/041036, Korean Intellectual Property Office, Republic of Korea.

International Searching Authority, International Search Report and Written Opinion, Korean Intellectual Property Office, Feb. 5, 2013, PCT/US2012/056704.

International Searching Authority, Korean Intellectual Property Office, International Search Report and Written Opinion, PCT/US2012/045964, Jan. 24, 2013.

Kistler, Thomas, "Continuous Program Optimization", PhD Dissertation, University of California, Irvine, 1999.

Kistler, Thomas, "Continuous Program Optimization: A Case Study", ACM Transactions on Programming Languages and Systems, vol. 25, No. 4, Jul. 2003, pp. 500-548.

Tong Li, Dan Baumberger, David A. Koufaty, and Scott Hahn, Efficient Operating System Scheduling for Performance-Asymmetric Multi-Core Architectures, Copyright 2007, ACM.

Yang Wang, Paul Lu, Using Dataflow Information to Improve Inter-Workflow Instance Concurrency, 2005, IEEE.

\* cited by examiner

NETWORK AWARE PROCESS SCHEDULING

BACKGROUND

Process scheduling is a general term that may refer to how a computer system utilizes its resources. Different levels of process schedulers may manage high level selections such as which applications to execute, while mid-level or low level process schedulers may determine which sections of each application may be executed. In some cases, a mid-level or high-level process scheduler may operate within a virtual machine or other executable environment, while a low level process scheduler may operate within an operating system. A low level process scheduler may perform functions such as time slicing or time division multiplexing that may allocate processors or other resources to multiple jobs.

SUMMARY

A schedule graph may be used to identify executable elements that consume data from a network interface or other input/output interface. The schedule graph may be traversed to identify a sequence or pipeline of executable elements that may be triggered from data received on the interface, then a process scheduler may cause those executable elements to be executed on available processors. A queue manager and a load manager may optimize the resources allocated to the executable elements to maximize the throughput for the input/output interface. Such a system may optimize input or output of network connections, storage devices, or other input/output devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
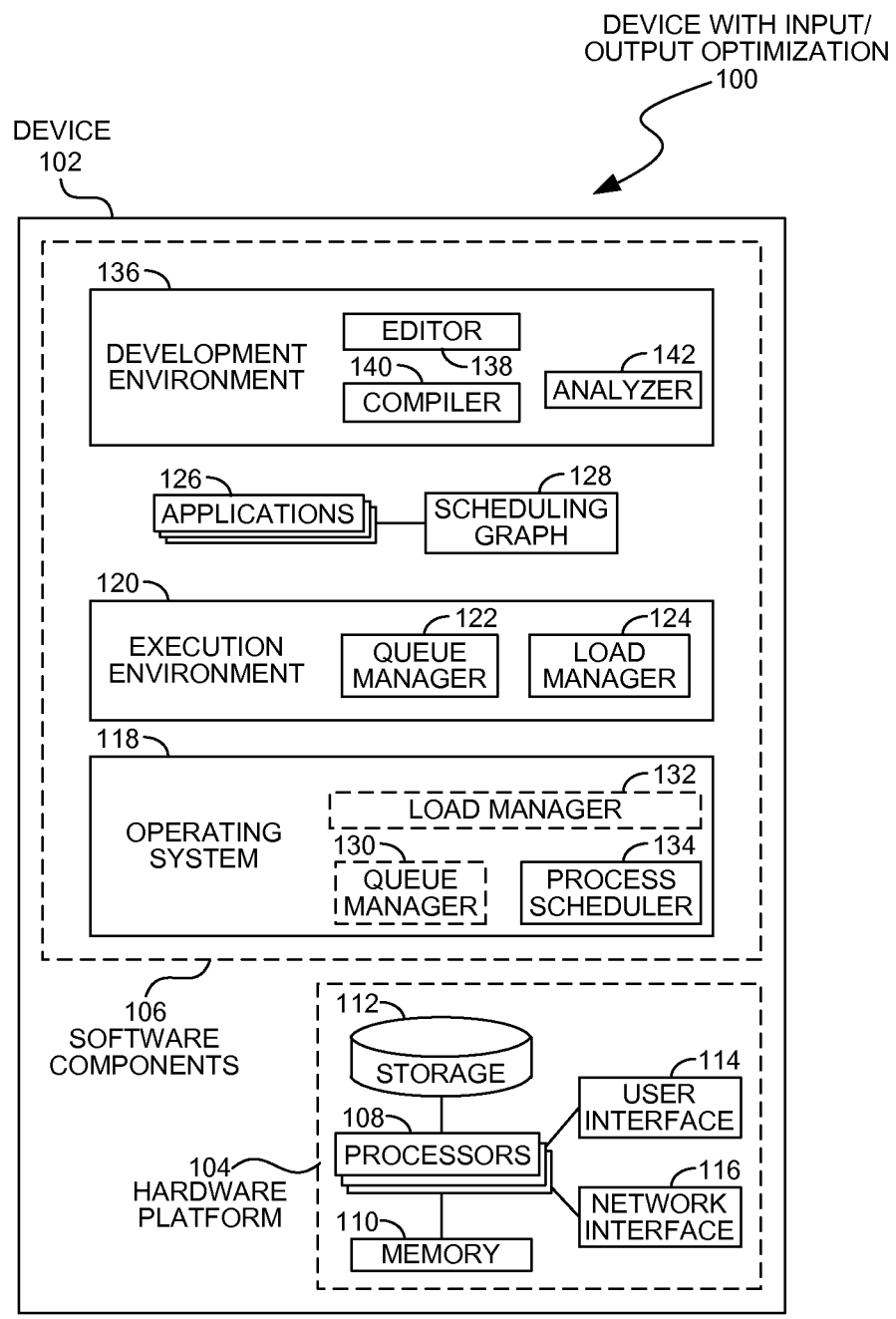
FIG. 1 is a diagram illustration of an embodiment showing a system with queue management.

A scheduling graph may be used to identify and schedule executable elements that process data received from an input, such as a network interface or other I/O interface. The executable elements may be prepared and queued for execution so that the data from the input may be processed quickly. In some embodiments, the process scheduler may optimize the processing of data from an input to maximize data throughput.

The scheduling graph may identify chains of executable elements that have dependencies that flow from data received. These executable elements may be scheduled to minimize intervening processes so that the data may be processed quickly and efficiently.

The dependencies between executable elements may be explicit or implicit. Explicit dependencies may be defined within a programming language and identified by a programmer. In some cases, compilers or linkers may analyze source code to identify and explicitly link various executable elements. The explicit links between executable elements may be identified by messages that may be passed between two elements. In some cases, the messages may be addressed and passed from one element to another.

Some dependencies may be implied by how data may be shared between executable elements. A dependency may be identified, for example, when a consuming element uses a data object created by a creating element. The consuming element may be considered to have a dependency on the creating element even though no other relationship may be identified during normal compilation and linking.

In one use scenario, the system may be used in high performance devices that may be optimized to process data passing through an interface. In order to maximize data flowing to or from the interface, an execution environment may schedule the upstream or downstream elements. Examples may include a webserver that may process incoming requests or a video processing system that may process video elements that may be displayed on a screen.

For the purposes of this specification and claims, the term "executable element" may define a set of instructions that may be executed by a processor. In a typical embodiment, an executable element may be machine level commands that may be sent to a processor. A single computer application may be made up of many executable elements. An executable element may also be referred to as a job, application, code chunk, or other term.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system that may optimize operations to maximize processing for input or output devices. Embodiment 100 is a simplified example of the various software and hardware components that may be used an execution environment for applications that may have many executable elements.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 illustrates a computer system 102 that may have a process scheduler that may manage executable elements based on knowledge from a scheduling graph. The system may optimize the processing of data to maximize the input or output of data to various devices. The optimization may maximize processing throughput so that data may be pulled from or pushed to a network interface, storage device, or other input/output devices.

Throughout this specification, the example embodiments may describe optimization for receiving data from a network card or other input device. However, the same principles may apply to optimizing for transmitting data to an output device. Unless specifically stated that an example applies to only input or output, the reader may apply the principles to either input or output scenarios.

The optimization mechanism may use a scheduling graph of executable elements to identify elements that may be executed upstream or downstream from an executable element that receives or transmits data to an input or output device. Such a group of executable elements may be scheduled to minimize any delay in processing, and may be further optimized by executing the elements at an elevated priority.

In some embodiments, the ongoing processing of the elements may be analyzed and further optimized. For example, one of the elements may prove to be a bottleneck, causing upstream elements to be congested and downstream elements to be starved. The bottleneck element may have additional resources allocated, such as additional processors, memory, or other resources, where the additional resources may increase the throughput of the bottleneck element. Such an optimization may be performed during execution until the input or output device is operating at full capacity.

The optimization mechanism may attempt to optimize the execution of an application, function, service, or other executables so that an input or output channel is transmitting data as fast as possible.

In one use scenario, a server computer may process web pages and may be connected to the Internet. The web service operating on the computer may be optimized to process incoming requests as fast as possible by optimizing how those requests are processed.

In another use scenario, a personal computer may process video images, and may retrieve video images from a camera, perform some post processing, and upload the images to a website. In the scenario, the gating item may be the uploading process. The software on the personal computer may be organized so that the uploading process has enough data so that it may continually process and upload data, thus minimizing the time consumed for an upload.

A process scheduler may be an operating system function that schedules executable code on a processor. In many computer systems, a process scheduler may create the illusion of executing several processes concurrently by time slicing or allocating a computing resource to different processes at different time intervals.

The process scheduler may have a queue manager that may analyze a scheduling graph to identify functional elements to add various queues used by a process scheduler to assign work to processors. The scheduling graph may contain each executable element and relationships between those executable elements. The queue manager may traverse the graph to find the elements that may be executed to meet various optimization criteria.

The scheduling graph may identify the functional elements of one or many applications, where an application may be a program that operates independently of other programs on a computer system. When a scheduling graph includes multiple applications, the scheduling graph may be considered a graph of graphs, with each application contributing a group of functional elements that may or may not have relationships with other applications within the overall scheduling graph.

In some embodiments, a queue scheduler may be implemented as a runtime environment in which applications are executed. Such an environment may be a virtual machine component that may have just in time compiling, garbage collection, thread management, and other features. In such an embodiment, a queue scheduler may interface with the runnable and idle queues of an operating system. When a queue scheduler is implemented in a runtime environment, one or more applications may have functional elements defined in the scheduling graph.

In other embodiments, the queue scheduler may be implemented as a component of an operating system. As an operating system component, some or all of the functional elements that are executed by a computer system may be identified within a scheduling graph. Such a scheduling graph may include functions relating to multiple applications as well as operating system functions. In such an embodiment, each operation that may be performed by a computer system may be added to the scheduling graph prior to any execution of such operation.

The process scheduler may be known as a CPU scheduler and may determine which of the ready, in-memory processes may be executed following a clock interrupt, I/O interrupt, operating system call, or other form of signal. In some embodiments, the process scheduler may be preemptive, which may allow the process scheduler to forcibly remove executing elements from a processor when the processor may be allocated to another process. In some embodiments, the process scheduler may be non-preemptive, which may be known as voluntary or cooperative process scheduler, where the process scheduler may be unable to force executing elements off of a processor.

The device 102 is illustrated having hardware components 104 and software components 106. The device 102 as illustrated represents a conventional computing device, although other embodiments may have different configurations, architectures, or components.

In many embodiments, the device 102 may be a server computer. In some embodiments, the device 102 may still also be a desktop computer, laptop computer, netbook computer, tablet or slate computer, wireless handset, cellular telephone, game console or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware components 104, and may include various routines and functions that communicate directly with various hardware components.

The operating system 118 may include a process scheduler 134 which may perform low level scheduling of each of the individual processors 108.

An execution environment 120 may manage the execution of an application 126. The execution environment 120 may have a queue manager 122 that may manage the executable elements by analysis of a scheduling graph 128 and determine which executable elements are transmitted to the process scheduler 134.

The queue manager 122 may identify individual executable elements from a scheduling graph 128. The scheduling graph 128 may define the relationships between executable elements for a specific application. The relationships may be explicit relationships, where express connections may be defined between elements. An example of such relationships may be message passing relationships. In some cases, the relationships may be implied relationships. An example of an implied relationship may be where one element consumes data created by another element. While such relationships may not be expressly defined in source code, implied relationships indicate a dependency between two elements.

The scheduling graph 128 may be similar to a control flow graph and may include each block of executable code and the dependencies or other relationships between the blocks. The scheduling graph 128 may be searched and traversed to identify relationships between an executing element and upstream or downstream elements. Once identified, the elements may be scheduled and caused to execute.

In some embodiments, scheduled executable elements may be prepared for execution as those elements are identified. For example, one such embodiment may retrieve the executable code from disk or other high latency storage area and load the executable code into random access memory, cache, or other lower latency storage area.

The scheduling graph 128 may be created when an application is developed. A development environment 136 may include an editor, 138, compiler 140, and an analyzer 142. A programmer or developer may create a program using the editor 138 and compile the program with the compiler 140. A control flow graph may be created by the compiler 140 or by a secondary analyzer 142 which may be executed after compilation.

From the control flow graph, an analyzer 142 may identify and classify the relationships between executable elements. The relationships may be any type of relationship, including dependencies, parallelism or concurrency identifiers, or other relationships. The relationships may be express or implied.

The execution environment 120 may be a virtual machine or other mechanism that may manage executing applications. In some cases, the execution environment may provide various management functions, such as just in time compiling, garbage collection, thread management, and other features.

In some embodiments, a queue manager 130 may be part of an operating system 118. In such embodiments, the operating system 118 may operate by receiving a set of functions to perform and a scheduling graph 128. The scheduling graph 128 may include functions that come from many different applications as well as functions that are performed by the operating system itself.

A load manager 124 may be part of the execution environment 120. In some embodiments, a load manager 132 may be part of the operating system 118.

A load manager may monitor the ongoing execution of elements and may make adjustments to the resources allocated to various elements to increase throughput. The load manager may identify executing elements that are bottlenecks or impede the processing of data, then may adjust the resources allocated to the elements to optimize the throughput of an input or output data flow.

The load manager may monitor the loads of each executable element through passive or active mechanisms. In some cases, the elements identified from the scheduling graph may be instrumented to provide monitoring data. In other cases, an execution environment or operating system may be capable of monitoring ongoing execution to identify how loaded each element may be. Still other embodiments may use other monitoring mechanisms.

The load manager may optimize by adjusting resources allocated to executing elements. In one example, an executing element that may be processed in parallel with other elements on the same processor may have additional time slices or larger time slices allocated to the bottleneck element. In other examples, an executing element may be placed on its own processor or two or more processors may be dedicated to the element. Other resources may be allocated to the executing elements, such as memory, network bandwidth, or other resources.

Figure 2:
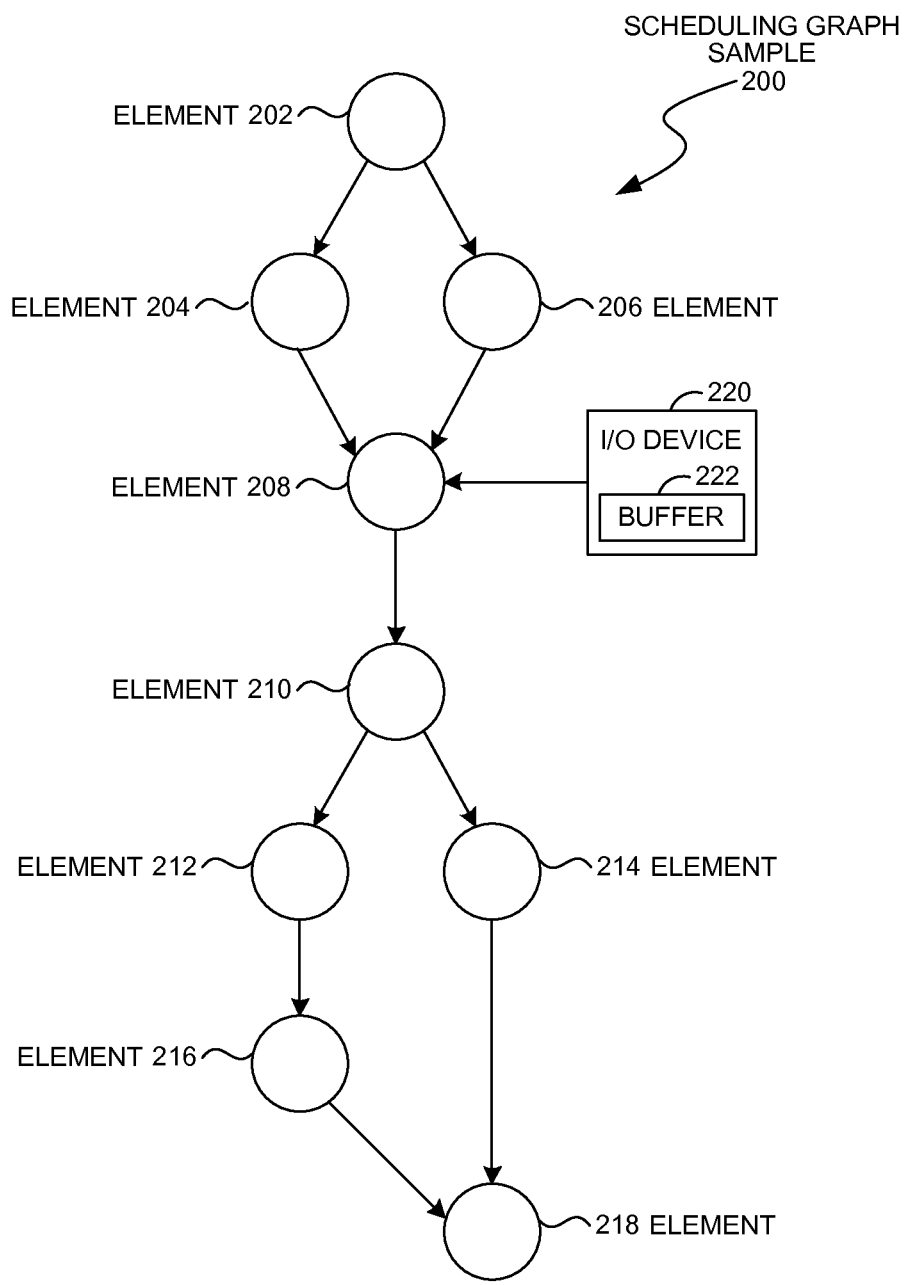
FIG. 2 is a diagram illustration of an embodiment showing an example scheduling graph with an input device.

FIG. 2 is a diagram illustration of an embodiment 200 showing an example scheduling graph. Embodiment 200 illustrates several executable elements and the relationships between those elements, as well as an input/output device.

Embodiment 200 illustrates execution elements 202, 204, 206, 208, 210, 212, 214, 216, and 218.

Element 202 is shown as having a one-way relationship with elements 204 and 206. Elements 204 and 206 have a one-way relationship with element 208, which has a one-way relationship with element 210. Element 210 has one-way relationships with elements 212 and 214. Element 212 has a one-way relationship with element 216, and elements 216 and 214 have one-way relationships with element 218.

Embodiment 200 illustrates a control flow graph or scheduling graph that illustrates a process flow from top to bottom. At element 208, an input/output device 220 may inject data that may be consumed by element 208.

The input/output device 220 may represent any type of device. In many cases, such as network interface cards, storage devices, or other devices, a buffer 222 may store data prior to being requested or used by an executing element.

In a case where an optimization may attempt to process as much incoming data from the device 220, a queue manager may analyze the scheduling graph to identify the downstream elements 210, 212, 214, 216, and 218. The queue manager may cause these downstream elements to be ready for execution by a process scheduler.

By scheduling downstream elements for processing, a queue manager may minimize any delays between elements. One case where such delays may occur may be when one element may wait for data from another element, but there may be no explicit link or relationship between the elements. In such cases, a process scheduler may not be able to recognize the relationship and schedule the waiting element.

The queue manager may prepare elements for execution by loading elements into memory, scheduling execution into an execution sequence, or otherwise preparing to execute the elements. In many embodiments, the queue manager may identify downstream elements as having a high or elevated priority, which may cause the elements to be processed faster and may preempt other services, processes, applications, or other executable elements.

The queue manager may also identify upstream elements 202, 204, and 206, which may precede element 208. The upstream elements may generate data or perform other tasks that are consumed by element 208. In order for element 208 to perform its task and consume data from the device 220, elements 202, 204, and 206 may first be executed.

The upstream elements may be launched and executed by the queue manager so that element 208 may consume data from device 220. In some embodiments, a queue manager may cause upstream elements to be executed in preparation of element 208 receiving data.

In order to optimize the throughput of the device 220, a queue manager may prioritize and schedule both upstream and downstream elements. In some embodiments, a load manager may optimize the resources allocated to each element so that a maximum throughput of the device 220 may be achieved.

Embodiment 200 illustrates an example where the various executable elements consume data from an input/output device. In some embodiments, the optimization may maximize the amount of data transmitted from the executing elements to an input/output device.

Figure 3:
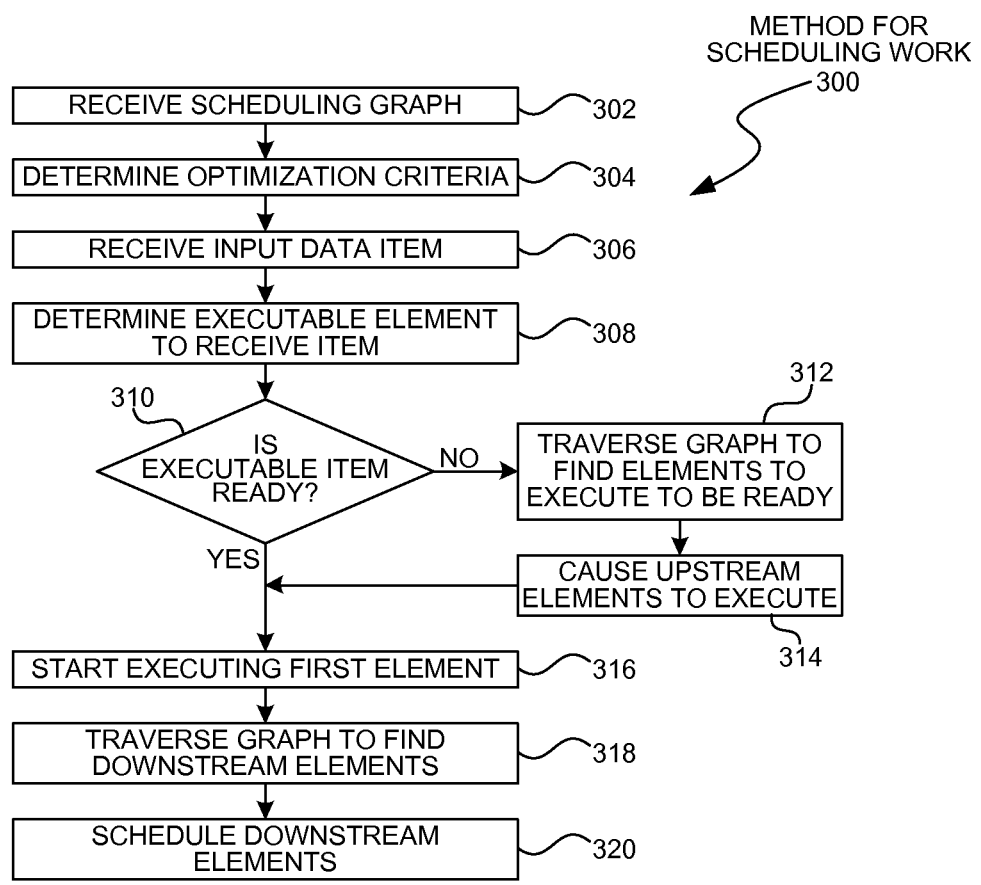
FIG. 3 is a flowchart illustration of an embodiment showing a method for scheduling work.

FIG. 3 is a flowchart illustration of an embodiment 300 showing a method for scheduling work using a scheduling graph. Embodiment 300 illustrates the operations of a queue manager, such as the queue manager 122 or 130 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a simple method for scheduling work for a low level process scheduler. The method of embodiment 300 may be performed by a queue manager that may identify executable elements that may be executed to optimize the processing of data received or transmitted from one of the executable elements.

Embodiment 300 examines a scheduling graph to identify upstream and downstream elements from an executable element that creates or consumes data. Those elements are caused to execute so that the data being created or consumed may be processed faster.

In block 302, a scheduling graph may be received. The scheduling graph may identify executable elements with relationships between those elements. The graph may be defined for a single application, multiple applications, or may include all executable elements that may be available for processing, which may include operating system level elements.

A set of optimization criteria may be defined in block 304. The optimization criteria may include optimizing for processing incoming or outgoing data. An example may be to optimize a system to consume as much data as possible from a network interface or to optimize the speed at which data may be created and transmitted to a storage system or other consumer.

In the example of embodiment 300, the executable elements to process a single data item may be identified and launched. Embodiment 400, described later in this specification, illustrates an example of a mechanism to optimize processing for a stream of data.

A data item may be received in block 306. In the example of embodiment 300, a queue manager may optimize processing of an incoming data item. Other embodiments may optimize processing of an outgoing data item.

The scheduling graph may be analyzed in block 308 to identify the executable element that consumes the data item of block 306.

If the executable element is ready to execute in block 310, the process may proceed to block 316 where the element may be executed. If the executable element is not ready to execute in block 310, the element may be waiting for data from other executable elements.

If such is the case in block 310, the scheduling graph may be traversed in block 312 to identify upstream elements that provide input to the executable element identified in block 308. Those upstream elements may be executed in block 314.

In many embodiments, a queue manager may prepare the executable elements for processing by placing those elements in a queue accessed by a process scheduler. The process scheduler or the queue manager may load the executable code into memory and may provide other operations in preparation for executing the elements.

Once the upstream elements are complete, the process may resume at block 316 to execute the element that consumed the data received in block 306.

A queue manager may identify downstream elements by traversing the scheduling graph in block 318 and prepare those elements for execution in block 320 where the elements are executed.

Figure 4:
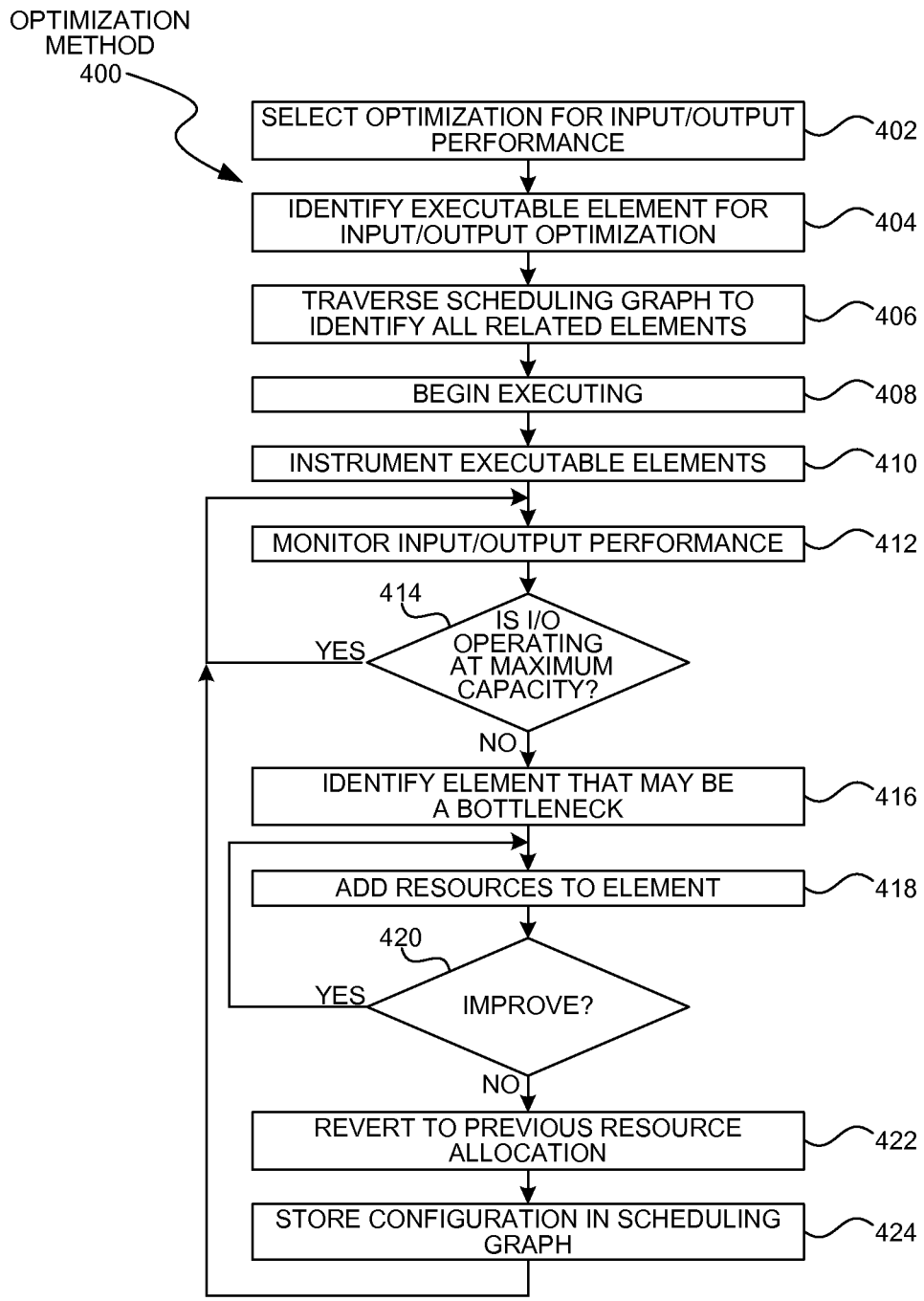
FIG. 4 is a flowchart illustration of an embodiment showing a method for optimizing for input/output throughput.

FIG. 4 is a flowchart illustration of an embodiment 400 showing a method for optimizing execution to maximize input or output throughput. Embodiment 400 illustrates the operations of a load manager, such as the load manager 124 or 132 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates a method to optimize execution to maximize throughput of a data stream. In the example of embodiment 400, the data stream may be an incoming data stream, although other embodiments may optimize outgoing data streams.

An optimization may be selected in block 402 for input or output performance. When the data stream to be optimized is an input stream, an executable element that receives the incoming stream may be identified in block 404. The identification may be made using a scheduling graph, which may be traversed in block 406 to identify all related elements. The operations of block 406 may be performed in a similar manner as embodiment 300, where the upstream and downstream elements may be identified. Those executable elements may begin execution in block 408.

The executable elements may be instrumented in block 410. In some embodiments, executable code may be added to the various elements for instrumentation uses. Other embodiments may have passive mechanisms to monitor how well each element is executing and what resources are being consumed by the elements. Such monitoring may occur in block 412.

If the input stream is operating at maximum capacity in block 414, the process may loop back to block 412 to continuing the monitoring.

If the input stream is not operating at maximum capacity in block 414, an element may be identified in block 416 that may be a bottleneck.

A load manager may add resources to speed up processing of the element in block 418. The additional resources may include additional processing, memory, or other resources. In the case of processing resources, the load manager may increase a time slice or amount of a shared processor allocated to the element. In some instances, one, two, or more processors may be allocated to execute the bottleneck element.

If the additional resources improve the throughput in block 420, the process may return to block 418 to add still more resources.

If the additional resources do not improve the throughput in block 420, the previous resource allocation may be established in block 422.

The configuration of the resource allocation may be stored in the scheduling graph in block 424. Such a configuration may be used in future deployments as a starting point configuration. The process may return to block 412 to continue monitoring.

Embodiment 400 illustrates a simplified method by which resources may be added to individual executing elements to increase the throughput of an input or output data stream. In some cases, the additional resources may be allocated to elements that are upstream or downstream from the executable element that handles the input or output data stream. Other embodiments may have more elaborate methods for finding an optimized resource allocation that maximizes data throughput.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
a plurality of processors, receiving input stream of data from a source;
a queue manager that:
    receives a scheduling graph from an analyzer, said scheduling graph comprising executable elements and relationships between said executable elements, said relationships comprising data dependency relationships;
    from said scheduling graph,
        identifies a first executable element that receives said input stream from the source;
        identifies a first set of executable elements comprising a plurality of executable elements being executed downstream from said first executable element; and
        identifies a second set of executable elements comprising a plurality of executable elements being executed upstream from said first executable element;
    schedules said second set of executable elements, said second set of executable elements being executed at an elevated priority by preempting other executable elements; and
    schedules said first set of executable elements such that a process scheduler causes said first set of executable elements to process said input stream of data;
a load manager that:
    monitors performance of said executable elements, by
    when processing of said input stream of data is operating at maximum capacity, continues said monitoring;
    when processing of said input stream is not operating at maximum capacity, identifies a second executable element downstream from said first executable element, said second executable element being a bottleneck for processing output from said first executable element; and allocates additional processing resources to said second executable element until said executable elements is operating at full capacity.

2. The system of claim 1, said source being a network input device.

3. The system of claim 1, said source being a data storage device.

4. A computerized method comprising:
receiving a scheduling graph from an analyzer, said scheduling graph comprising executable elements and relationships between said executable elements, said relationships comprising data dependency relationships;

receiving an input stream, comprising a plurality of data items from a data source, said input stream being consumed by a first executable element defined within said scheduling graph;

identifying a second executable element from said scheduling graph, said second executable element having a data dependency relationship with said first executable element;

identifying a third executable element from said scheduling graph, said first executable element being dependent on said third executable element prior to consuming said input stream;

scheduling said third executable element such that said process scheduler causes said third executable element to be executed prior to said first executable element;

scheduling said second executable element such that a process scheduler causes said second executable element to be executed after said first executable element;

identifying a fourth executable element being dependent on said first executable element, said fourth executable element causing said first executable element to wait to process said input stream; and allocating additional processing resources to said fourth executable element;

determining a current rate at which said first executable element processes said input stream; and measuring a change in said current rate when said fourth executable element has been allocated said additional processing resources;

when said change is positive, adding additional processing resources; and when said change is not positive, removing at least some of said additional processing resources.

5. The method of claim 4, said second executable element not having a message passing relationship with said first executable element.

6. The method of claim 4 further comprising: storing configuration of resource allocation in the scheduling graph.

7. The system of claim 1, said scheduling graph being defined within a development environment.

8. The system of claim 1, said scheduling graph being defined by an analyzer executed after compilation.

9. The system of claim 1, said dependency relationships being identified after monitoring said executable elements.

10. The system of claim 9, said dependency relationships comprising a shared data object.

11. The system of claim 1, said queue manager being part of an execution environment.

12. The system of claim 1, said additional processing resources comprising executing said second executable element at an elevated priority.

13. The system of claim 1, said additional processing resources comprising assigning additional processors.

14. The system of claim 1, said additional processing resources comprising assigning additional memory resources.

15. The method of claim 4, said additional processing resources comprising executing said fourth executable element an elevated priority.

16. The method of claim 4, said additional processing resources comprising assigning additional processors.

17. The method of claim 4, said additional processing resources comprising assigning additional memory resources.

* * * * *